Feb. 5, 1929.
C. W. SWOPE
1,701,165
SHEET DRAWING APPARATUS
Original Filed March 28, 1925
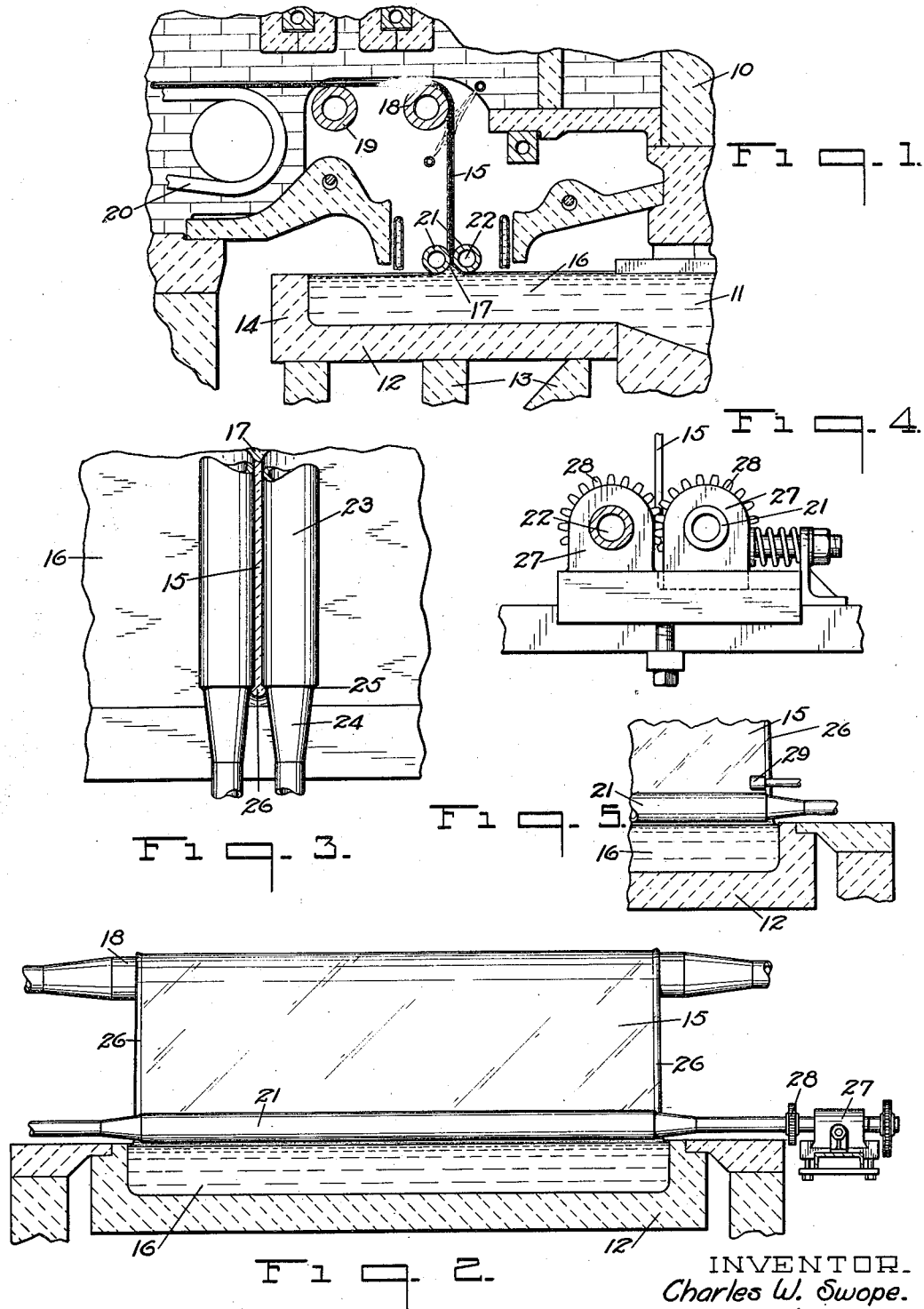
INVENTOR.
Charles W. Swope.
Frank Fraser,
ATTORNEY.

Patented Feb. 5, 1929.

1,701,165

UNITED STATES PATENT OFFICE.

CHARLES W. SWOPE, OF TOLEDO, OHIO, ASSIGNOR TO THE LIBBEY-OWENS SHEET GLASS COMPANY, OF TOLEDO, OHIO, A CORPORATION OF OHIO.

SHEET-DRAWING APPARATUS.

Application filed March 28, 1925, Serial No. 18,938. Renewed July 20, 1928.

The present invention relates to sheet glass apparatus, and has particular reference to an apparatus adapted for continuously drawing or pulling a sheet from a mass of molten glass.

An important object of the invention is to provide an apparatus adapted to form a flat sheet of glass having a uniform thickness and which will also be of a uniform width.

Another object of the invention is to provide an apparatus wherein a sheet of glass may be continuously drawn from a mass of molten glass and includes rotatable rolls arranged at the sheet source for controlling the amount of glass permitted to pass into the sheet while at the same time the sheet thus formed will be of a uniform thickness throughout its entire width.

Still another object of the invention is to provide an apparatus of this nature wherein the rolls arranged at the sheet source which are provided to produce a flat and uniform thickness of sheet, will be so associated with the sheet source that the ends thereof will form a relatively thick preferably beaded edge on the sheet being drawn, the said edge being of such a nature that it will hold the sheet to width and prevent narrowing thereof.

Other objects and advantages of the invention will become apparent during the course of the following description.

In the drawings wherein like numerals are employed to designate like parts throughout the same:

Fig. 1 is a fragmentary vertical longitudinal section through a portion of the apparatus showing my improved construction in use, Fig. 2 is a transverse vertical section thereof, Fig. 3 is a fragmentary plan view illustrating the type of edge formed on the sheet, Fig. 4 is an end view of the driving mechanism, Fig. 5 is a fragmentary elevation disclosing a slightly modified form of construction.

My invention is particularly well adapted for use on the Colburn machine which is set forth in the Colburn Patent 1,248,809, granted Dec. 4, 1917. In this patent a tank furnace 10 having a source of molten glass 11 therein is in communication with a draw-pot 12 supported upon suitable stools or the like 13. The draw-pot 12 has one end in open communication with the tank furnace 10 and also has a closed end 14. The sheet 15 is drawn from the pool of glass 16 in the pot 12, the said sheet having a so-called sheet source or meniscus 17. The sheet in the Colburn machine is drawn for a short distance in a vertical plane, after which it is deflected over a highly polished bending roll 18, whereby the sheet may be run over an idler roll 19, draw-table 20, and through an annealing leer which is not shown.

The type of sheet glass produced by the Colburn process is of a high quality, but it is my desire to improve upon the thickness of the sheet to make it more uniform than has heretofore been possible. In the Colburn machine some form of edge engaging rolls which are usually knurled are provided at the edges of the sheet being drawn to grip and retard the same whereby knurled edges are formed on the sheet. After the sheet is properly annealed, the knurled edges are removed which means a considerable waste of glass. With the present form of construction this relatively large waste of edge glass is obviated.

As is shown in Fig. 1, a pair of highly polished rolls 21 are arranged at the meniscus 17. The rolls 21 are preferably of a diameter to give an outer surface which is approximately of the same curvature as the natural curvature of the meniscus. They are also formed from preferably a highly polished heat resisting non-corrosive metallic alloy so that they can be subjected to the relatively high temperature without sustaining injury. If it is desired, the rolls may be provided with an internal bore 22 by which means a heat absorbing medium may be circulated therethrough.

The central portion 23 of the rolls 21 are not as long as the sheet is broad. The rolls 21 are provided with the reduced ends 24 which create a shoulder 25 between the portions 23 and 24. In this manner the sheet 15 will be drawn up between the two rolls while a small portion of glass will hang over the ends of the portions 23 and lock against the shoulders 25, whereby a beaded edge 26 will be formed. The beaded edge 26 will be of a nature to prevent narrowing of the sheet after it has been formed.

The rolls 21 are preferably positively driven, and as shown in Fig. 4, may be supported in the journals 27, one of which is adjustable to permit relative adjustment of the rolls. Gears 28 are keyed to the rolls to positively drive the same in opposite directions. The teeth of the gears are of sufficient length to permit relative movement thereof within the limits required without danger of disengagement. The speed of the rolls may be varied to suit various conditions. In this connection it is to be pointed out that the rolls may be driven relatively very slowly to create a dragging action on the sheet being drawn or they may be rotated relatively fast to feed up or advance the glass from the sheet source comparatively rapidly whereby the sheet 15 may be very quickly drawn. In all cases, however, the thickness of the sheet throughout its entire width will be uniform as the rolls 21 will gauge and control the amount of glass entering into the sheet. This is an important feature, especially in the production of so-called plate glass blanks whereby the sheets are, after they are produced by this machine, surfaced on suitable grinding and polishing machines as is well understood in the art. By producing blanks in this manner very little surfacing will be required, as the sheet will be obsolutely uniform in thickness which is not true in the case of other blanks formed in different types of machines.

In Fig. 5 is shown a slight modification wherein supplementary smooth rolls 29 are provided just inside of the bead 26 to further prevent narrowing of the sheet. Although it has been stated that a cooling medium may be circulated through the rolls 21 it is not to be understood that the cooling medium is necessarily cold in nature as the temperature of the rolls can be accurately controlled by circulating the proper temperature of medium therethrough. In some instances it may be desirable to run a relatively hot fluid through the rolls. It will depend upon the type of sheet, and glass from which it is formed, which is used.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, means for drawing a sheet from a mass of molten glass, rotatable rolls arranged at the base thereof for controlling the thickness of sheet being drawn and for producing a uniform thickness of sheet, the ends of the rolls being shaped to create beaded edges on the sheet, and means engaging the beaded edges to prevent narrowing of the sheet.

2. In sheet glass apparatus a receptacle containing a mass of molten glass, means for drawing a sheet of glass therefrom, and a roll arranged on each side of the sheet and fitting substantially into the natural curvature of the base of said sheet, said rolls creating a sheet forming pass and producing a sheet of substantially predetermined and uniform thickness.

3. In sheet glass apparatus a receptacle containing a mass of molten glass, means for drawing a sheet therefrom, and a non-corrosive roll arranged on each side of said sheet and disposed at its base, said rolls fitting substantially into the natural curvature of the base of said sheet, said rolls being adjustably associated to permit the formation of any thickness of sheet.

4. In sheet glass apparatus a receptacle containing a mass of molten glass, means for drawing a sheet therefrom, and a non-corrosive roll arranged on each side of said sheet and disposed at its base, said rolls fitting substantially into the natural curvature of the base of said sheet, said rolls being adjustably associated to permit the formation of any thickness of sheet, and means for controlling the temperature of the sheet.

5. In sheet glass apparatus a receptacle containing a mass of molten glass, means for drawing a sheet therefrom, a non-corrosive roll arranged on each side of said sheet and disposed at its base, said rolls fitting substantially into the natural curvature of the base of said sheet, said rolls being adjustably associated to permit the formation of any thickness of sheet, and means for positively driving said rolls.

6. In sheet glass apparatus a receptacle containing a mass of molten glass, means for drawing a sheet therefrom, and a non-corrosive roll arranged on each side of said sheet and disposed at its base, said rolls fitting substantially into the natural curvature of the base of said sheet, said rolls being adjustably associated to permit the formation of any thickness of sheet, said rolls being shaped to produce beaded edges on said sheet.

Signed at Toledo, in the county of Lucas, and State of Ohio, this 25th day of March, 1925.

CHARLES W. SWOPE.